United States Patent
Khafagy et al.

(10) Patent No.: US 9,682,705 B2
(45) Date of Patent: Jun. 20, 2017

(54) VEHICLE HAVING ACC STOP AND GO WITH BRAKING AUTO-HOLD TO INCREASE ENGINE AUTOSTOP AVAILABILITY

(71) Applicant: Ford Global Technologies, LLC, Dearborn, MI (US)

(72) Inventors: Hafiz Shafeek Khafagy, Dearborn, MI (US); Kirk Pebley, Novi, MI (US); Aaron L. Mills, Ann Arbor, MI (US); Chad Michael Korte, Grosse Ile, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/825,259

(22) Filed: Aug. 13, 2015

(65) Prior Publication Data

US 2017/0043767 A1   Feb. 16, 2017

(51) Int. Cl.
*B60W 10/06* (2006.01)
*B60W 30/09* (2012.01)
*B60W 10/184* (2012.01)

(52) U.S. Cl.
CPC ............ *B60W 30/09* (2013.01); *B60W 10/06* (2013.01); *B60W 10/184* (2013.01); *B60W 2520/04* (2013.01); *B60W 2520/10* (2013.01); *B60W 2540/10* (2013.01); *B60W 2550/10* (2013.01); *B60W 2550/142* (2013.01); *B60W 2550/308* (2013.01); *B60W 2710/0666* (2013.01); *B60W 2720/10* (2013.01); *B60W 2720/106* (2013.01)

(58) Field of Classification Search
None
See application file for complete search history.

(56) References Cited

U.S. PATENT DOCUMENTS

| | | | |
|---|---|---|---|
| 4,696,222 A | 9/1987 | Han | |
| 6,708,099 B2 | 3/2004 | Tellis et al. | |
| 8,157,035 B2 | 4/2012 | Whitney et al. | |
| 2013/0297161 A1* | 11/2013 | Gibson | B60W 20/00 701/54 |
| 2015/0203108 A1* | 7/2015 | Loria | B60W 50/0098 701/93 |

FOREIGN PATENT DOCUMENTS

DE   102004004992 A1   9/2005

* cited by examiner

*Primary Examiner* — Derek D Knight
(74) *Attorney, Agent, or Firm* — David B. Kelley; Brooks Kushman P.C.

(57) ABSTRACT

A vehicle includes an engine with auto-stop and auto-start functions. The vehicle additionally includes a braking system configured to apply braking torque to vehicle wheels. The vehicle further includes a controller configured to control the engine and braking system via an ACC system in response to a detected forward object. The controller is configured to automatically control the braking system in response to a distance to the detected forward object falling below a first predefined threshold and a vehicle speed falling below a second predefined threshold. In response to these inputs, the controller automatically controls the braking system to apply a braking torque to hold the vehicle stationary in the absence of powertrain torque based on a current road grade. The controller additionally controls the engine to auto-stop in response to these inputs.

12 Claims, 4 Drawing Sheets

VEHICLE HAVING ACC STOP AND GO WITH BRAKING AUTO-HOLD TO INCREASE ENGINE AUTOSTOP AVAILABILITY

TECHNICAL FIELD

One or more embodiments relate to a vehicle system and method for controlling brake systems and engine shutdown and restart during a drive cycle when an adaptive cruise control system is active.

BACKGROUND

There are many instances when a vehicle stops before its destination is reached during a typical driving event. This may occur, for example, when the vehicle stops at traffic signals, cross-walks, stop signs and the like. A stop-start vehicle may enable a stop-start strategy for starting and stopping the vehicle engine during a drive cycle. The engine is shutdown if no power is required (e.g. while waiting at a traffic light). As soon as power is requested, the engine is automatically restarted. The engine may also be automatically started in response to other conditions such as a decrease in battery state of charge or a gear lever being shifted from one gear to another. By avoiding unnecessary engine idling, the vehicle's fuel economy will be improved. For this reason, it is desirable to use the engine shutdown function as much as possible when engine stop conditions are satisfied.

Conventional vehicles typically include a primary brake system and a secondary brake system. The primary brake system is a hydraulic system whereby depression of a brake pedal increases hydraulic pressure within the system which applies one or more brake pads against a rotating member (e.g., a rotor) of each wheel to effect friction braking. The secondary brake system, or parking brake system, is a mechanical system whereby actuation of a lever translates a cable which applies one or more brake pads against a rotating member of each rear wheel.

An electric or electronic parking brake (EPB) system replaces one or more components of the parking brake system with an actuator. There are generally two different types of EPB systems: "cable puller" EPB systems and wheel mount EPB systems. A cable puller EPB system replaces the parking brake lever with an actuator. The actuator is controlled by a switch within the passenger compartment to translate or "pull" the mechanical cables and apply the brake pads. Wheel mount EPB systems include an actuator that is integrated into a wheel mounted brake caliper. Such systems replace the parking brake lever and the mechanical cables.

SUMMARY

A vehicle according to the present disclosure includes an engine with auto-stop and auto-start functions. The vehicle additionally includes a braking system configured to apply braking torque to vehicle wheels. The vehicle further includes a controller configured to control the engine and braking system to decelerate the vehicle in response to an ACC mode being active and to a detected forward object. The controller is further configured to automatically control the braking system in response to a distance to the detected forward object falling below a first predefined threshold and a vehicle speed falling below a second predefined threshold while the ACC mode is active. In response to these inputs, the controller automatically controls the braking system to apply a braking torque to hold the vehicle stationary in the absence of powertrain torque based on a current road grade. The controller additionally controls the engine to auto-stop in response to these inputs.

According to a first embodiment, the braking system has an auto-hold function configured to, after braking the vehicle to a full stop, automatically apply braking torque independent of a brake pedal position. In the first embodiment, the controller is configured to activate the auto-hold function in response to vehicle speed being below a first predefined threshold, a distance to a detected forward object being below a second predefined threshold, the engine being auto-stopped, and the distance to a detected forward object not increasing for an elapsed time exceeding a predefined time interval after the engine is auto-stopped.

According to a variation of the first embodiment, the controller is further configured to, in response to the distance to the forward object not increasing within the predefined time interval after the engine is automatically stopped, maintain the engine in an automatically stopped condition independent of a brake pedal position and/or gear shifter position. In an additional variation of the first embodiment, the controller is further configured to automatically start the engine in response to the distance to the detected forward object increasing within the predefined time interval.

According to a second embodiment, the controller is further configured to automatically start the engine in response to a vehicle subsystem auto-stop-inhibit condition being satisfied.

According to a third embodiment, the controller is further configured to automatically start the engine in response to a driver actuation of an accelerator pedal.

A method of controlling a vehicle according to the present disclosure includes automatically decelerating the vehicle in response to an ACC mode being active and a forward object being detected. The method additionally includes automatically commanding vehicle brakes to apply a braking torque in response to the ACC mode being active, a distance to the detected forward object falling below a first predefined threshold, a vehicle speed falling below a second predefined threshold, and a detected current grade. The braking torque is applied to brake the vehicle to a full stop and hold the vehicle stationary at the current grade in the absence of powertrain torque.

In a first embodiment, the method further includes automatically stopping the engine. The automatic stopping of the engine is in response to the vehicle braking to a full stop and the vehicle brakes applying a braking torque to hold the vehicle stationary in the absence of powertrain torque.

In a variation of the first embodiment, the method further includes automatically commanding the vehicle brakes to maintain the braking torque independent of a brake pedal position in response to the distance to the detected forward object not increasing within a predefined time interval after the engine is automatically stopped.

In various further embodiments, the method further includes, in response to the distance to the detected forward object remaining constant within a predefined time interval after the engine is automatically stopped, maintaining the engine in an automatically stopped condition independent of the brake pedal position and/or a gear shifter position. In additional embodiments, the method further includes automatically starting the engine in response to the distance to the detected forward object increasing within the predefined time interval, in response to a vehicle subsystem auto-stopinhibit condition being satisfied, and/or in response to a driver actuation of an accelerator pedal.

A method of controlling a vehicle according to the present disclosure, where the vehicle has an engine configured to auto-stop and auto-start, includes controlling a braking system to provide a braking torque to hold the vehicle stationary at the current road grade independent of powertrain torque and auto-stopping the engine. The controlling of the braking system and the auto-stopping of the engine are in response to an ACC system decelerating the vehicle based on a detected forward object to a vehicle speed below a speed threshold, a distance to the forward object being below a distance threshold, and to a detected current grade.

Embodiments according to the present disclosure provide a number of advantages. For example, embodiments according to the present disclosure may automatically decelerate a vehicle, auto-stop the engine, and engage auto-hold braking when appropriate without user intervention, increasing customer satisfaction. Furthermore, embodiments according to the present disclosure may subsequently maintain the engine in an auto-stopped condition regardless of brake pedal position or shifter position, which may increase fuel economy and reduce unnecessary wear and tear.

The above and other advantages and features of the present disclosure will be apparent from the following detailed description of the preferred embodiments when taken in connection with the accompanying drawings.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
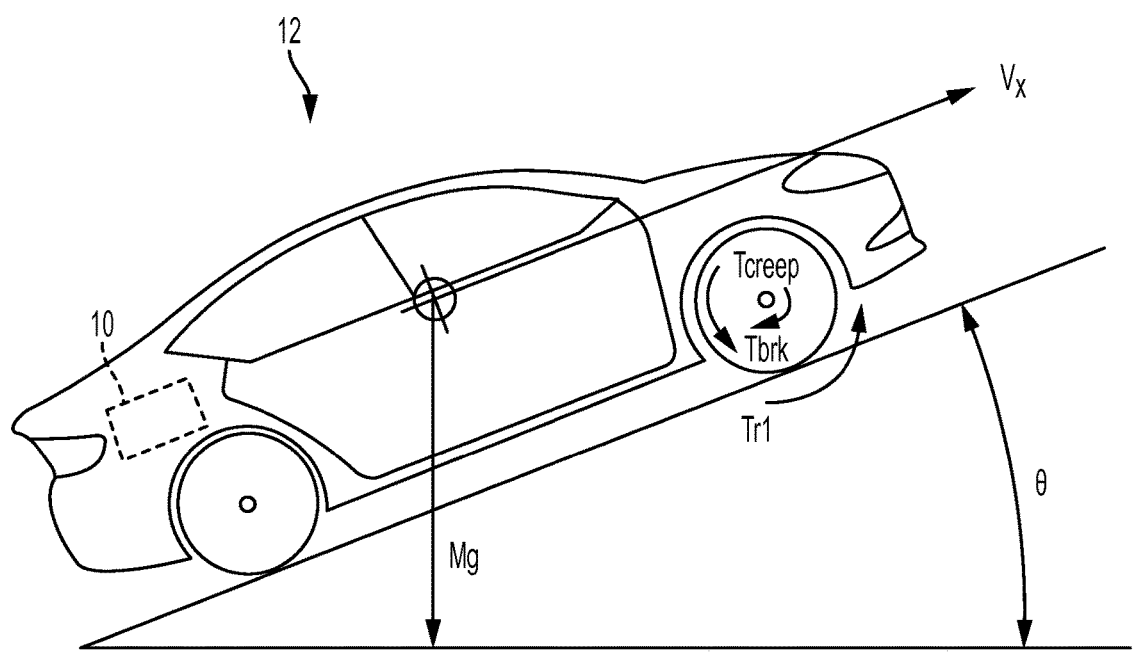
FIG. 1 is a side view of a vehicle illustrated on a road inclined at a gradient.

With reference to FIG. 1, a vehicle system for controlling brake systems during engine shutdown and restart is illustrated in accordance with one or more embodiments and is generally referenced by numeral 10. The vehicle system 10 is depicted within a vehicle 12. In the illustrative example depicted in FIG. 1, the vehicle 12 is stopped upon an inclined surface and illustrated with a number of forces and moments acting thereon. The surface has a gradient θ, which may also be referred to as a road gradient. The resultant torque at the wheels of the vehicle, $T_{veh}$, may be calculated using equation 1 as shown below:

$$T_{veh} = T_{creep} + T_{brk} - T_{rl} = 0 \tag{1}$$

Where $T_{creep}$ represents the output torque provided by the engine at idle speed, $T_{brk}$ is the total brake torque provided by the vehicle brake system(s), and $T_{rl}$ is the torque acting on the vehicle due to "road load" or external forces. $T_{creep}$ is depicted as a positive or clockwise moment, and $T_{rl}$ and $T_{brk}$ are depicted as negative or counter-clockwise moments. $T_{brk}$ acts against the rotation of the wheels and would therefore act as a clockwise moment about the wheels when the vehicle is propelled in a rearward direction by $T_{rl}$, and $T_{brk}$ would act as a counter-clockwise moment about the wheels when the vehicle is propelled in a forward direction by the engine 16. Although each moment is illustrated about a front axle of the vehicle 12, $T_{rl}$ and $T_{brk}$ may both act about both the front and rear axles. In a front-wheel drive vehicle, as depicted in FIG. 1 and shown in further detail in FIG. 2, $T_{creep}$ only acts about the front axle because the engine is not mechanically connected to the rear axle. Because the vehicle 12 is at standstill, $T_{veh}$ is equal to zero and the primary road load is due to gravity. Equation 2 represents an equation for calculating the road load torque ($T_{rl}$):

$$T_{rl} = Mg \, \text{Sin}(\theta) * R_w \tag{2}$$

Where M is the mass of the vehicle; g is the acceleration due to gravity; θ is road gradient; and $R_w$ is the radius of the drive wheels.

Figure 2:
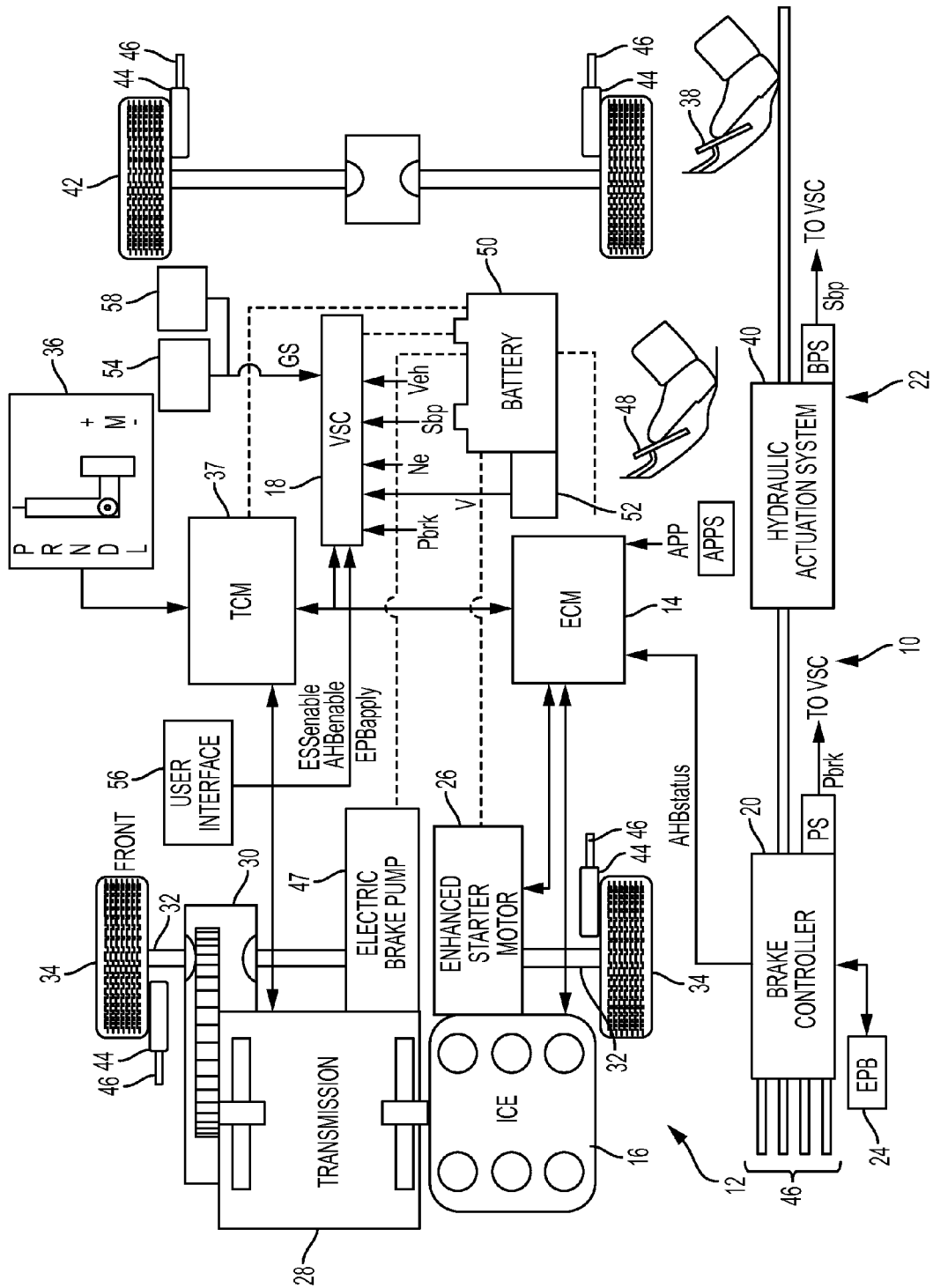
FIG. 2 is a schematic diagram of a vehicle system for controlling brake systems during engine shutdown and restart according to one or more embodiments.

Referring to FIG. 2, the vehicle includes an engine control module (ECM) 14 for controlling an internal combustion engine (ICE) 16. The vehicle 12 is a stop-start vehicle according to one or more embodiments, and includes an engine 16 that may be controlled by the ECM 14 to repeatedly auto-stop and auto-start during a drive cycle to reduce fuel consumption. The vehicle 12 also includes a vehicle system controller (VSC) 18 that is in communication with the ECM 14 and the vehicle system 10. The vehicle system 10 includes a brake controller 20 that communicates with the ECM 14 and the VSC 18. The vehicle system also includes a primary brake system 22 and a secondary brake system 24.

Referring back to FIG. 1 and equation 1, the vehicle torque ($T_{veh}$) must be equal to zero to maintain the vehicle 12 at standstill on an inclined surface. However, if the ECM 14 shuts down the engine 16, then the creep torque ($T_{creep}$) decreases to zero. To maintain the vehicle 12 at standstill without restarting the engine 16, the vehicle system 10 may increase the brake torque ($T_{brk}$) to compensate for the decrease in $T_{creep}$. The brake controller 20 coordinates the control of the primary brake system 22 and the secondary brake system 24 to increase $T_{brk}$ when the engine 16 is shutdown to maintain the position of the vehicle 12 and to avoid roll-back.

The vehicle 12 includes an enhanced starter motor 26 that is coupled to an engine crankshaft. The starter motor 26 receives electrical power and provides output torque to the crankshaft for starting the engine 16.

The vehicle 12 includes a transmission 28 for adjusting the output torque of the engine 16. Torque from the engine 16 is transferred through the transmission 28 to a differential 30 by a transmission output shaft. Axle half shafts 32 extend from the differential 30 to a pair of drive wheels 34 to provide drive torque for propelling the vehicle 12.

The vehicle 12 includes a shifter 36 for selecting a transmission gear. The shifter 36 includes a sensor (not shown) for providing an output signal that corresponds to a selected transmission gear (e.g., PRNDL). A transmission control module (TCM) 37 communicates with the shifter 36 and the transmission 28 for adjusting the transmission gear ratio based on the shifter selection. Alternatively the shifter 36 may be mechanically connected to the transmission 28 for adjusting the transmission gear ratio.

The brake controller 20 includes a controller that is in electrical communication with the ECM 14 and the VSC 18. The primary brake system 22 includes a hydraulic actuation system 40 that converts the motion of a brake pedal 38 into fluid pressure. The hydraulic actuation system 40 includes a booster and a master cylinder. The brake controller 20 is in fluid communication with the hydraulic actuation system 40.

The vehicle 12 includes the drive wheels 34 and driven wheels 42. Each wheel 34, 42 includes a wheel brake assembly 44, such as a caliper or drum brake assembly. A series of hydraulic lines 46 extend between the brake controller 20 and the wheel brake assemblies 44. The wheel brake assemblies 44 convert the hydraulic pressure into a clamp force that acts upon a rotating member of the wheels to effect friction braking. The brake controller 20 includes antilock braking functionality for pulsating the hydraulic pressure. The brake controller 20 also includes an electric brake pump 47 that may be controlled during auto-hold braking (AHB) to increase the brake pressure within the hydraulic lines 46 when the engine is shutdown.

The primary brake system 22 also includes sensors for providing information that corresponds to current brake characteristics, such as a brake pedal position switch (BPS) for providing a brake pedal state ($S_{bp}$) signal that corresponds to a brake pedal position (e.g., applied or released). In other embodiments, the primary brake system 22 includes a position sensor (not shown) for measuring pedal position. The primary brake system 22 also includes one or more sensors for providing output indicative of a braking effort or brake torque that may be measured or derived. In the illustrated embodiment, the sensors include pressure sensors (PS) for providing a brake pressure ($P_{brk}$) signal that corresponds to an actual brake pressure value within the brake system (e.g., brake line pressure or master cylinder pressure).

The vehicle system 10 includes the secondary brake system 24. The secondary brake system is a wheel mount EPB system 24, according to one or more embodiments. A wheel mount EPB system 24 includes an actuator that is integrated into the rear wheel assemblies 44. In other embodiments, the EPB system 24 includes an actuator (not shown) that is mounted to the vehicle frame (not shown) and configured to translate or pull mechanical cables that are connected to the rear wheel assemblies 44.

The brake controller 20 is configured to provide auto-hold brake (AHB) pressure functionality, whereby the brake controller 20 controls or maintains a desired brake torque when the engine is shut down to prevent the vehicle from rolling when stopped on a hill. The brake controller 20 may control the electric brake pump 47 for adjusting the pressure within the hydraulic system and/or control the EPB system 24 for adjusting wheel torque. In a preferred embodiment, the auto-hold brake pressure functionality is activated in response to a braking event in which the vehicle 12 is braked to a full stop. In one or more embodiments, the brake controller 20 provides a status signal (AHB status) that is indicative of whether or not the AHB functionality is active.

The vehicle 12 includes an accelerator pedal 48 with a position sensor (APPS) for providing an accelerator pedal position (APP) signal that corresponds to a driver demand for propulsion. The ECM 14 controls the throttle of the engine 16 based on the APP signal. In one or more embodiments, the ECM 14 generates a signal ($T_{accel}$) that is indicative of a driver demanded acceleration torque at the wheels, based on APP.

The vehicle 12 includes an energy storage device, such as a battery 50. The battery 50 supplies electrical energy to the vehicle controllers and devices, e.g., the electric pump 47 and the starter motor 26, as generally indicated by dashed lines in FIG. 1. The vehicle 12 may include a single battery 50, such as a conventional low voltage battery, or multiple batteries, including a high voltage battery. Additionally, the vehicle 12 may include other types of energy storage devices, such as capacitors or fuel cells. The vehicle 12 includes a sensor 52 which provides a signal (V) that is indicative of a present voltage of the battery 50.

The vehicle 12 also includes a gradient sensor 54 which provides a signal (GS) that is indicative of a gradient or slope of the vehicle. In one or more embodiments, the gradient sensor 54 is an accelerometer that provides GS based in part on a gravity force component. In other embodiments, the gradient sensor 54 is an inclinometer. In one embodiment, the vehicle system 10 includes a road grade estimator or algorithm that determines road gradient based on GS. In other embodiments, the vehicle includes a navigation system (not shown) that provides signals that may be used for road gradient estimation.

The vehicle 12 includes a user interface 56 that communicates with the VSC 18, according to one or more embodiments. The user interface 56 may include a touch screen display and/or a series of knobs and dials (not shown). The user may manually control engine and brake system functionality using the user interface 56. The user interface 56 provides input signals (ESS_enable, EPB_apply, AHB_enable) to the VSC 18 that are indicative of a user request to enable/disable engine start/stop functionality, apply the EPB 24, and enable/disable AHB functionality, respectively.

The VSC 18 communicates with other vehicle systems, sensors and controllers for coordinating their function. As shown in the illustrated embodiment, the VSC 18 receives a plurality of input signals (e.g., ESS_enable, AHB_enable, EPB_apply, $P_{brk}$, engine speed ($N_e$), $S_{bp}$, vehicle speed (Veh), shifter status (PRNDL_status), etc.) from various vehicle systems and sensors. Although it is shown as a single controller, the VSC 18 may include multiple controllers that may be used to control multiple vehicle systems according to an overall vehicle control logic, or software. The vehicle controllers, including the VSC 18, ECM 14 and the brake controller 20 generally include any number of microprocessors, ASICs, ICs, memory (e.g., FLASH, ROM, RAM, EPROM and/or EEPROM) and software code to co-act with one another to perform a series of operations. The controllers also include predetermined data, or "look up tables" that are based on calculations and test data and stored within the memory. The vehicle controllers communicate with each other and other vehicle systems over one or more wired or wireless vehicle connections using common bus protocols (e.g., CAN and LIN).

The VSC 18 communicates with the ECM 14 to control the automatic shutdown and automatic restart of the engine 16 based on input signals that correspond to brake apply and release conditions. The vehicle system 10 anticipates a vehicle launch event based on brake release conditions. By shutting down the engine 16, a stop-start vehicle may have improved fuel economy as compared to a conventional vehicle.

While the embodiment illustrated in FIG. 2 includes a hydraulic actuation system and an electric brake pump, other embodiments within the scope of the invention may include other types of braking systems, including but not limited to linear actuators, a vacuum booster, or electric brake-by-wire systems.

Figure 3:
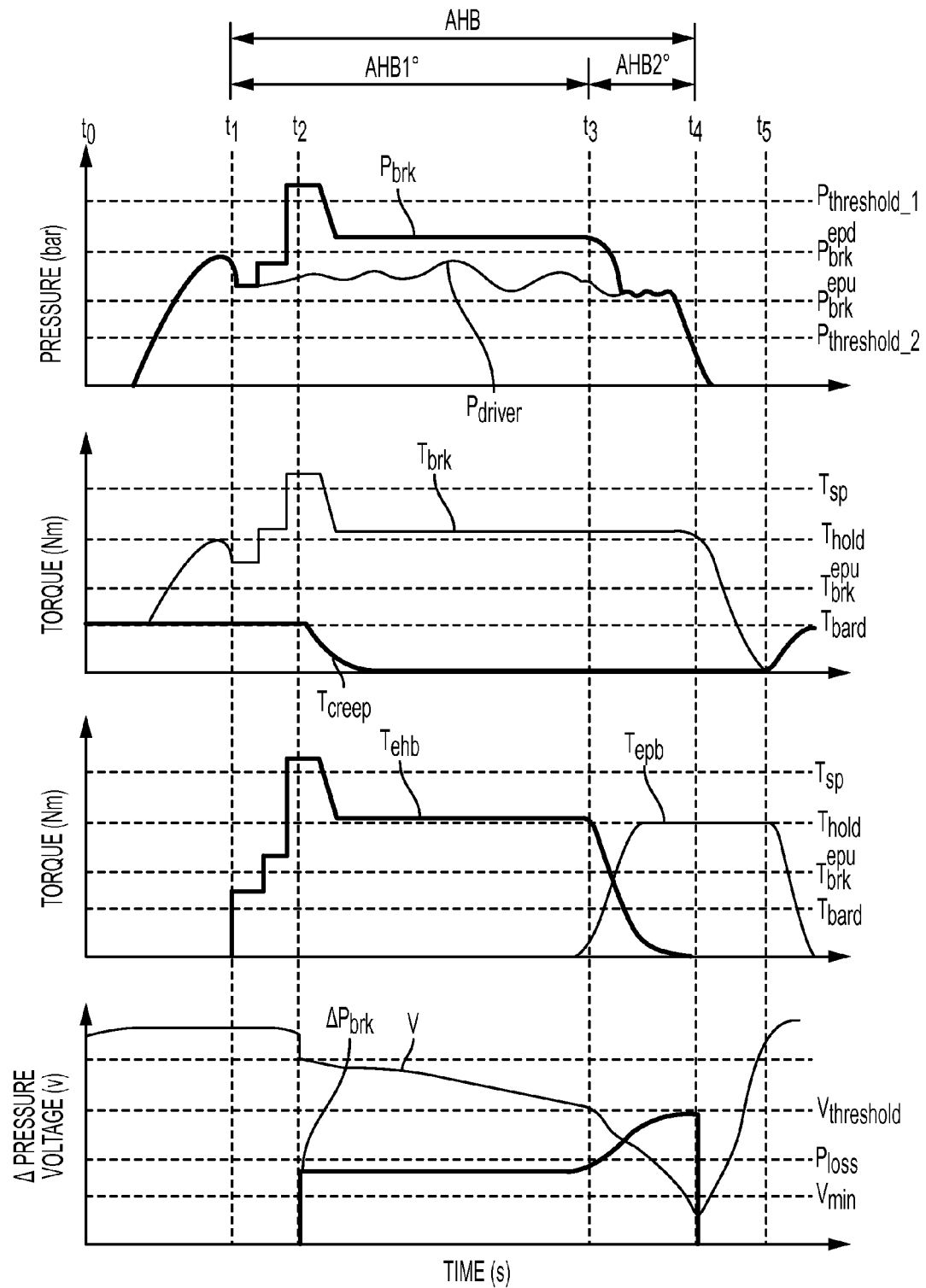
FIG. 3 is a time plot of brake system characteristics during a vehicle standstill event, illustrating the controlled coordination of the brake systems by the vehicle system of FIG. 1.

FIG. 3 is a time plot illustrating waveforms ($P_{brk}$, $P_{driver}$, $T_{brk}$, $T_{creep}$, $T_{ehb}$, $T_{epb}$, V and $\Delta P_{brk}$) of brake system characteristics during a vehicle standstill event. A first plot includes the $P_{brk}$ and $P_{driver}$ waveforms. $P_{brk}$ represents the actual brake pressure measured within the primary brake system (e.g., within the brake lines or master cylinder). $P_{driver}$ represents an estimated brake pressure within the primary brake system corresponding to the force applied by the user to the brake pedal 38. A second plot includes the $T_{brk}$ and the $T_{creep}$ waveforms. $T_{brk}$ represents the total brake torque provided by the vehicle brake systems (e.g. a sum of brake torques provided by the the primary brake system 22 and the secondary brake system 24). $T_{creep}$ represents the engine output torque at idle speed or "creep torque". A third plot includes the $T_{chb}$ and the $T_{cpb}$ waveforms. $T_{chb}$ represents the torque provided by the primary brake system 22 and the electric brake pump 47 during the auto-hold braking. $T_{epb}$ represents the torque applied by the second brake system 24 (i.e., the EPB system), which may be determined based on current provided to the EPB and/or linear travel of the EPB system 24. A fourth plot includes the V and $\Delta P_{brk}$ waveforms. V represents battery voltage and $\Delta P_{brk}$ represents the change in brake pressure (or pressure loss) during an AHB event.

The waveforms illustrated in FIG. 3 are plotted over a common period of time during a vehicle standstill event. At time ($t_0$) the vehicle is stopped, as shown in FIG. 1. After $t_0$, the engine 16 is idling and providing creep torque, as indicated by $T_{creep}$, and the driver applies the brake pedal 38, as indicated by the increasing $P_{brk}$ and $T_{brk}$ waveforms. At time ($t_1$) the AHB system is activated and the driver partially releases the brake pedal 38, as illustrated by the decrease in $P_{brk}$ and $T_{brk}$. The AHB functionality may be enabled/disabled by the user through the user interface 56. In one or more embodiments, AHB functionality is enabled by default, and the user may disable AHB functionality using the user interface 56.

The vehicle system 10 is configured to coordinate the brake torque provided by each of the primary brake system 22 and the secondary 24 brake system so that the driver may relax during a vehicle standstill event when the vehicle 12 is stopped on a gradient. This is illustrated by the relatively constant brake pressure ($P_{brk}$) 1 and brake torque ($T_{brk}$) waveforms after $t_2$, despite a variable force applied to the brake pedal by the user, as depicted by the varying $P_{driver}$ waveform.

At time ($t_2$) the engine is pulled down. After $t_2$, $T_{creep}$ decreases to zero because the engine is shutdown. At time ($t_3$) the vehicle system 10 coordinates releasing the electric brake pump 47 and activating the EPB system 24. The vehicle system 10 coordinates this transition between AHB using the primary braking system ("AHB 1°") to AHB using the secondary brake system ("AHB 2°") so that the total brake torque ($T_{brk}$) remains constant, as illustrated by the $T_{brk}$ waveform between $t_3$ and $t_4$. Additionally, because the EPB system 24 is not coupled to the hydraulic brake system, $T_{brk}$ remains constant between $t_3$ and $t_4$, even though $P_{brk}$ decreases. At time ($t_4$) the vehicle system 10 instructs the ECM 14 to pull up the engine 16. At time ($t_5$) the vehicle system 10 releases the EPB system 24.

Engine stop-start (ESS) and auto-hold braking (AHB) functionality may operate independently of each other. The driver may enable/disable engine stop-start (ESS) and/or auto-hold braking (AHB) using the user interface 56. The vehicle system 10 preferably coordinates ESS functionality with AHB functionality to maximize vehicle fuel economy and improve driver comfort. The vehicle system 10 also coordinates the control of the electric brake pump 47 and the EPB system 24 to provide the AHB functionality. The vehicle system 10 improves driver comfort by extending the time in which a driver may release the brake pedal during a prolonged vehicle stop on an inclined surface.

The vehicle 12 is also configured for Adaptive Cruise Control (ACC). ACC refers to a control system for automatically controlling a host vehicle, including maintaining both a desired speed and distance from forward vehicles in the lane of travel. In this embodiment, the ACC system is implemented in the VSC 18; however, in other embodiments the ACC system may be implemented in other appropriate controllers or a combination thereof. The VSC 18 is in communication with a forward object sensor 58, which may include RADAR, LIDAR, ultrasonics, cameras, or other sensors or combination thereof. When the ACC mode is active, the VSC 18 directly or indirectly controls throttle and brake systems to control host vehicle acceleration and deceleration according to an ACC algorithm. The ACC algorithm is configured to maintain at least a predefined distance from a detected forward object or target vehicle positioned forward of the vehicle 12.

Some ACC algorithms are configured for so-called "stop-and-go" operation, e.g. to control vehicle braking systems to brake the vehicle to a full stop when necessary in response to a detected forward object or vehicle and to subsequently control throttle to accelerate and resume travel. While such ACC algorithms may brake a vehicle to a full stop, in vehicles having engines configured to auto-stop and auto-start, such stop-and-go operation may be inadequate to permit the engine to be auto-stopped on an inclined surface due to the engine idle torque, as discussed above with respect to FIG. 1.

Figure 4:
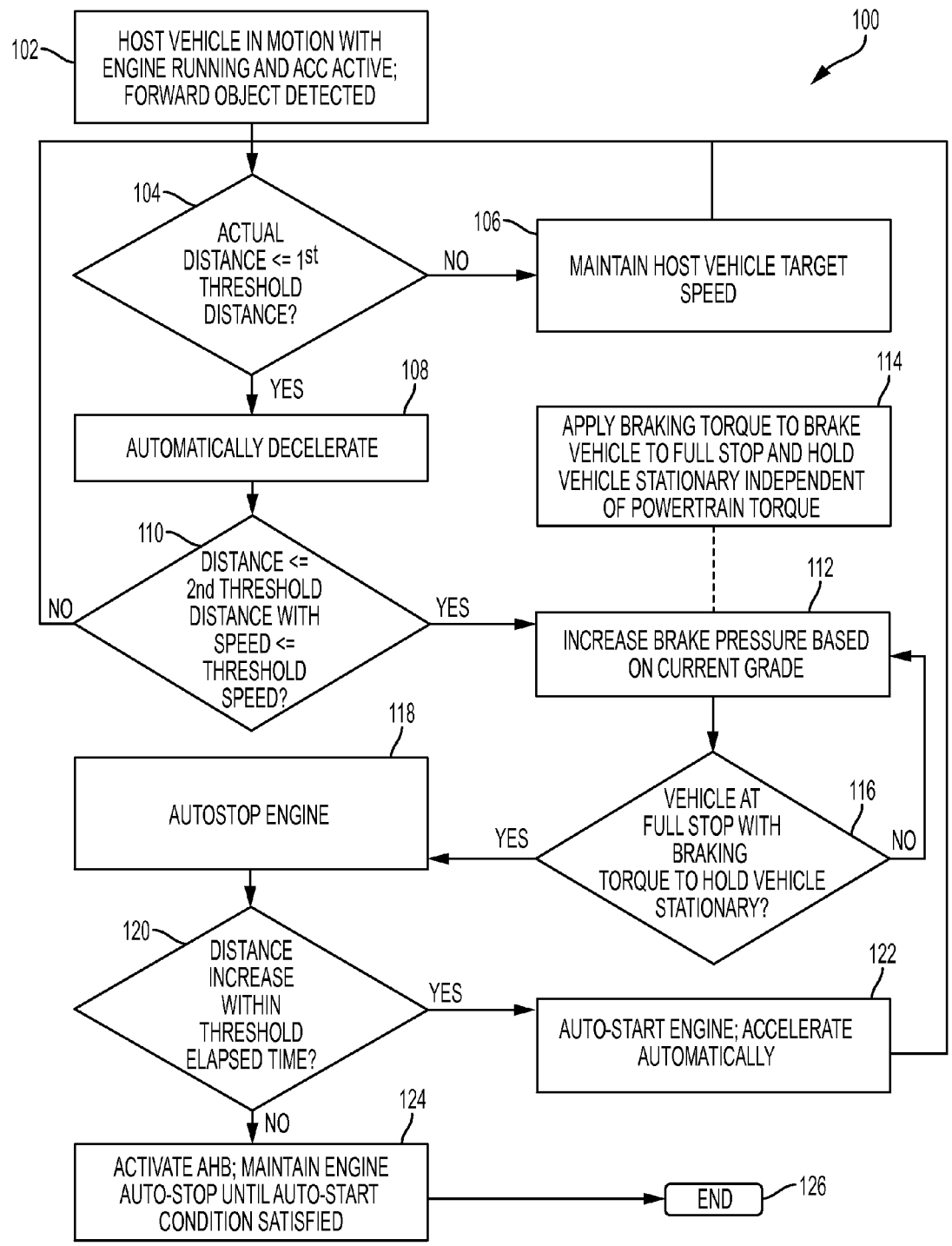
FIG. 4 is a flow chart illustrating a method for controlling engine and brake systems during ACC operation.

Referring to FIG. 4, a method for controlling brake systems and engine stop-start during ACC operation is illustrated in accordance with one or more embodiments and generally referenced by numeral 100. The method 100 may be implemented using software code shared between multiple controllers including the VSC 18, ECM 14, and brake controller 20 according to one or more embodiments. In other embodiments the software code is contained in other controllers or a single controller as appropriate.

The method begins at block 102 with the host vehicle 12 in motion with the engine 16 running, the ACC mode active with a target speed set, and a forward object being detected, e.g. by sensor 58. At operation 104, a determination is made of whether a distance to the detected forward object is less than or equal to a first threshold distance. As a nonlimiting example, the first threshold distance may be five meters. Other values may, of course, be used.

If the determination is negative, i.e. the distance to the detected forward object exceeds the first threshold distance, control proceeds to block 106. At block 106, the ACC system controls throttle and brake systems to maintain the vehicle 12 at the target speed. Control then returns to operation 104.

Returning to operation 104, if the determination is positive, i.e. the distance to the detected forward object is less than or equal to the first threshold distance, control proceeds to block 108. At block 108, the VSC 18 controls the vehicle to automatically decelerate, e.g. by commanding the ECM 14 to reduce throttle and/or commanding the brake controller 20 to increase brake pressure in the primary brake system 22. Control then proceeds to operation 110.

At operation 110, a determination is made of whether the distance to the detected forward object is less than or equal to a second threshold distance and whether current vehicle speed is less than or equal to a threshold speed. The second threshold distance is less than the first threshold distance and may be, for example, one meter. The threshold speed may be, for example, five miles per hour. Other values may, of course, be used.

If the determination is negative, i.e. the distance to the detected forward object exceeds the second threshold distance and/or the current vehicle speed exceeds the threshold speed, control returns to operation 104. Thus, the ACC system continues to decelerate the vehicle until the determination of operation 104 is negative or the determination of operation 110 is positive.

Returning to operation 110, if the determination is positive, i.e. the distance to the detected forward object is less than or equal to the second threshold distance and the current vehicle speed is less than or equal to the threshold speed, the control proceeds to block 112. At block 112, the brake pressure is increased based on a current road grade. The brake pressure may be increased, for example, by commanding the brake controller 20 to increase brake pressure in the primary brake system 22. The current road grade may be detected, for example, based on a signal GS from the gradient sensory 54.

As illustrated at block 114, increasing the brake pressure preferably includes applying a braking torque that is adequate to brake the vehicle to a full stop, and also adequate to hold the vehicle stationary independent of powertrain torque. It should be noted that, due to engine idle torque, the braking torque required to brake the vehicle to a full stop may be greater than that required to hold the vehicle stationary when the vehicle is on a downhill grade, and less than that required to hold the vehicle stationary when the vehicle is on an uphill grade.

Control proceeds to operation 116. At operation 116, a determination is made of whether the vehicle is at a full stop, i.e. vehicle speed is equal to zero, and whether the current braking torque is adequate to hold the vehicle stationary independent of powertrain torque.

If the determination is negative, i.e. the vehicle is not at a full stop and/or the current braking torque is inadequate to hold the vehicle stationary independent of powertrain torque, control returns to block 112. Thus, the brake pressure is increased until both conditions are satisfied.

Returning to operation 116, if the determination is positive, i.e. the vehicle is at a full stop and the current braking torque is adequate to hold the vehicle stationary independent of powertrain torque, control proceeds to block 118. At block 118, the VSC 18 issues a pull-down request and the ECM 14 auto-stops the engine. Thus, when the vehicle 12 is very close to the detected forward object and traveling at very low speeds, the engine may be shut off to increase fuel economy. Control then proceeds to operation 120.

At operation 120, a determination is made of whether the distance to the detected forward object increases within a threshold elapsed time after the engine is auto-stopped. The threshold elapsed time may be, for example, three seconds, though other values may be used. An increase in distance to the detected forward object while the engine is auto-stopped may signify that the detected forward object is a vehicle that is accelerating away from the vehicle 12.

If the determination is positive, i.e. the distance to the detected forward object increases within the threshold elapsed time after the engine is auto-stopped, control proceeds to block 122. At block 122, the VSC 18 issues a pull-up request and the ECM 14 auto-starts the engine. The VSC 18 then controls the ECM 14 and brake controller 20 according to the ACC algorithm to automatically accelerate the vehicle. Control then returns to operation 104.

Returning to operation 120, if the determination is negative, i.e. the distance to the detected forward object does not increase within the threshold elapsed time after the engine is auto-stopped, control proceeds to block 124. At block 124, the AHB functionality is activated and the engine 16 is maintained in the auto-stopped condition. The VSC 18 issues a pull-up request in response to a driver actuation of the accelerator pedal 48 or in response to an auto-start inhibit condition from a vehicle subsystem. Such auto-start inhibit conditions include, but are not limited to, battery state of charge being below a calibratable threshold, system voltage being below a calibratable threshold, or a diagnostic signal being generated from an accelerator pedal sensor, speed sensor, or range sensor.

In a preferred embodiment, the VSC 18 does not issue a pull-up request in response to a driver actuation of the brake pedal 38 or the shifter 36. In a further preferred embodiment, the VSC 18 does not issue a pull-up request in response to a driver actuation of the shifter 36, unless the shifter is moved from PARK to another gear, in which case the VSC 18 issues a pull-up request.

Control then proceeds to the algorithm end, as illustrated at block 126.

As may be seen, the present disclosure provides a system and method for controlling an engine and braking system in a vehicle to reduce speed, stop, and brake when necessary without user interference. In addition, embodiments according to the present disclosure may allow the engine to auto-stop while on a road grade and to remain auto-stopped while the brake pedal is actuated or released or the shifter is moved, thus increasing fuel economy and reducing unnecessary engine starts.

Variations on the above are, of course, possible. As an example, embodiments according to the present disclosure may be implemented in any vehicle having an engine configured to automatically stop according to one operating condition and automatically start according to a second operating condition during a drive cycle, including hybrid electric vehicles. As a further example, embodiments according to the present disclosure may be implemented when the ACC system is inactive. In such embodiments, the AHB function may be engaged when a driver manually brakes the vehicle below the threshold speed, the engine is auto-stopped, the distance to the detected forward object is less than the second threshold distance, and the distance to the detected forward object does not increase within the threshold elapsed time after the engine is auto-stopped.

While the best mode has been described in detail, those familiar with the art will recognize various alternative designs and embodiments within the scope of the following claims. Additionally, the features of various implementing embodiments may be combined to form further embodiments of the invention. While various embodiments may have been described as providing advantages or being preferred over other embodiments or prior art implementations with respect to one or more desired characteristics, those of ordinary skill in the art will recognize that one or more features or characteristics may be compromised to achieve desired system attributes, which depend on the specific application and implementation. These attributes may include, but are not limited to: cost, strength, durability, life cycle cost, marketability, appearance, packaging, size, serviceability, weight, manufacturability, ease of assembly, etc. The embodiments described herein that are described as less desirable than other embodiments or prior art implementations with respect to one or more characteristics are not outside the scope of the disclosure and may be desirable for particular applications. Additionally, the features of various implementing embodiments may be combined to form further embodiments of the invention.

What is claimed is:

1. A vehicle comprising:
    an engine;
    a braking system; and
    a controller configured to, independent of brake pedal position,
        responsive to a detected forward object and an adaptive cruise control mode being active, control the engine and braking system to decelerate the vehicle, and
        responsive to a distance to the detected forward object falling below a first predefined threshold and a vehicle speed falling below a second predefined threshold with the adaptive cruise control mode being active, automatically control the braking system to apply a braking torque to brake the vehicle to a full stop and hold the vehicle stationary in an absence of powertrain torque based on a current road grade, and subsequently auto-stop the engine and increase the braking torque.

2. The vehicle of claim 1, wherein the controller is further configured to, responsive to the distance to the detected forward object not increasing within a predefined time interval after the engine is auto-stopped, maintain the engine in an auto-stopped condition independent of a gear shifter position.

3. The vehicle of claim 1, wherein the controller is further configured to, responsive to the distance to the detected forward object increasing within a predefined time interval, auto-start the engine.

4. The vehicle of claim 1, wherein the controller is further configured to, responsive to a vehicle subsystem auto-stop-inhibit condition being satisfied, auto-start the engine.

5. The vehicle of claim 1, wherein the controller is further configured to, responsive to actuation of an accelerator pedal, auto-start the engine.

6. A method comprising:
    independent of brake pedal position, and responsive to adaptive cruise control being active, a distance to a detected forward object falling below a first predefined threshold, a vehicle speed falling below a second predefined threshold, and a detected road grade, automatically applying braking torque to full stop a vehicle and hold the vehicle stationary in an absence of powertrain torque, and subsequently auto-stopping an engine and increasing the braking torque.

7. The method of claim 6, further comprising, responsive to the distance to the detected forward object remaining constant within a predefined time interval after the engine is auto-stopped, maintaining the engine in an auto-stopped condition independent of a gear shifter position.

8. The method of claim 6, further comprising, responsive to the distance to the detected forward object increasing within a predefined time interval after the engine is auto-stopped, auto-starting the engine.

9. The method of claim 6, further comprising, responsive to a vehicle subsystem auto-stop-inhibit condition being satisfied, auto-starting the engine.

10. The method of claim 6, further comprising, responsive to a driver actuation of an accelerator pedal, auto-starting the engine.

11. A method comprising:
    independent of brake pedal position, and responsive to adaptive cruise control decelerating a vehicle based on a detected forward object to a speed below a speed threshold, a distance to the forward object being below a distance threshold, and a detected road grade, controlling a braking system to provide a braking torque to hold the vehicle stationary at the road grade independent of powertrain torque, and subsequently auto-stopping an engine and increasing the braking torque.

12. The method of claim 11, further comprising, responsive to the distance to the detected forward object remaining constant within a predefined time interval after the engine is auto-stopped, maintaining the engine in an auto-stopped condition independent of a gear shifter position.

* * * * *